United States Patent [19]

Stobbart

[11] Patent Number: 5,466,018

[45] Date of Patent: Nov. 14, 1995

[54] SEAL RING AND JOINT

[75] Inventor: John Stobbart, Sketty, United Kingdom

[73] Assignee: Techlok Limited, Port Talbot, United Kingdom

[21] Appl. No.: 302,659

[22] PCT Filed: Mar. 9, 1993

[86] PCT No.: PCT/GB93/00493

§ 371 Date: Sep. 8, 1994

§ 102(e) Date: Sep. 8, 1994

[87] PCT Pub. No.: WO93/18331

PCT Pub. Date: Sep. 16, 1993

[30] Foreign Application Priority Data

Mar. 12, 1992 [GB] United Kingdom .................. 9205404
Nov. 30, 1992 [GB] United Kingdom .................. 9224993

[51] Int. Cl.[6] ........................................... F16L 25/00
[52] U.S. Cl. ...................... 285/334.2; 285/336; 285/363; 285/917; 277/225; 277/236
[58] Field of Search ..................... 285/336, 917, 285/363, 334.2; 277/166.5, 225, 236

[56] References Cited

U.S. PATENT DOCUMENTS 1,821,866  9/1931  Wilson ............................. 285/917 X
3,141,685  7/1964  Watts ............................... 285/336 X
4,603,892  8/1986  Abbes et al. ...................... 285/917 X

FOREIGN PATENT DOCUMENTS 801604  1/1951  Germany .............................. 285/917
833252  4/1960  United Kingdom ..................... 285/336

*Primary Examiner*—Dave W. Arola
*Attorney, Agent, or Firm*—David P. Gordon

[57] ABSTRACT

A seal ring (4) and connection joint (1) for connecting and sealing conduits/pressure vessels (2, 3) and the like is disclosed. The seal ring comprises a sealing portion (5) having a pair of seal lips (6, 7) sloping radially outwardly to a web portion (8), the web portion extending radially outwardly to a spigot (9) having portions projecting transversely to the web. The thickness of the spigot in the radial direction (w) is substantially greater than the thickness of the web in the transverse direction (t), and the seal lips project transversely from the web by a distance (h) which is substantially greater than the thickness of the web in the transverse direction (t). This configuration provides improved seal characteristics. The joint (1) comprises the seal ring interposed at the interface between two conduit (or vessel) members (2, 3), the conduit or vessel members being provided with respective recesses (10, 11) arranged to receive the sealing lips and spigot of the seal ring.

19 Claims, 4 Drawing Sheets

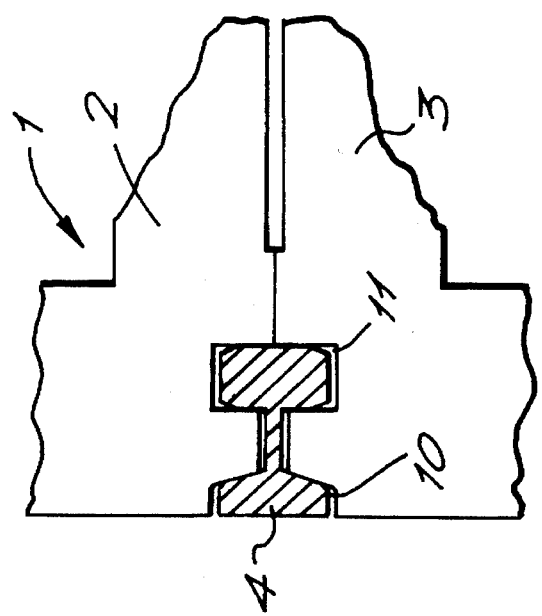
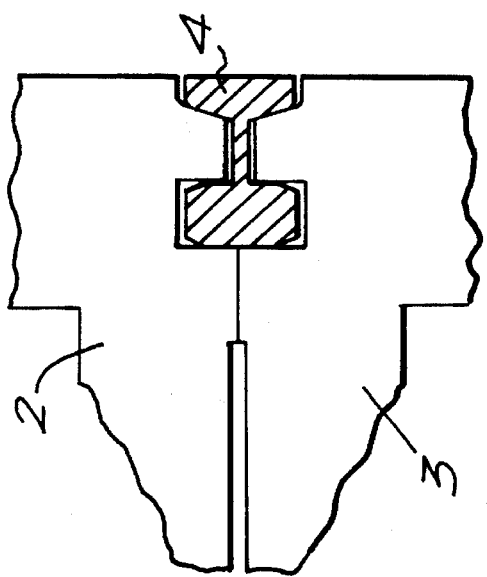
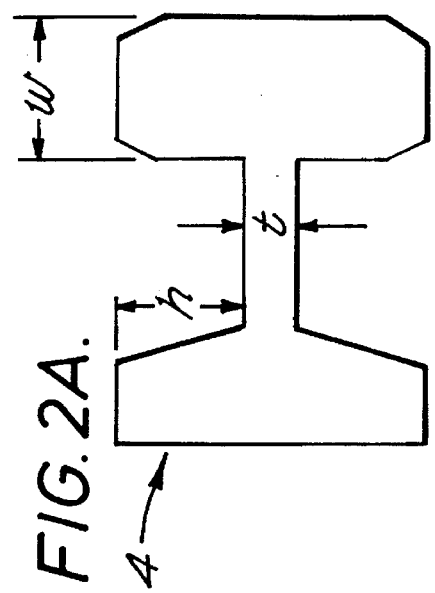
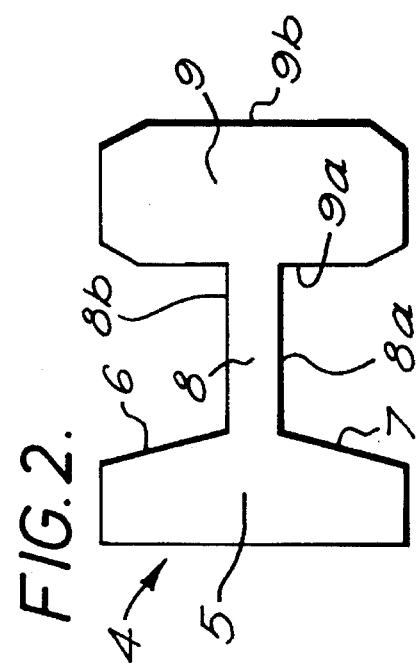

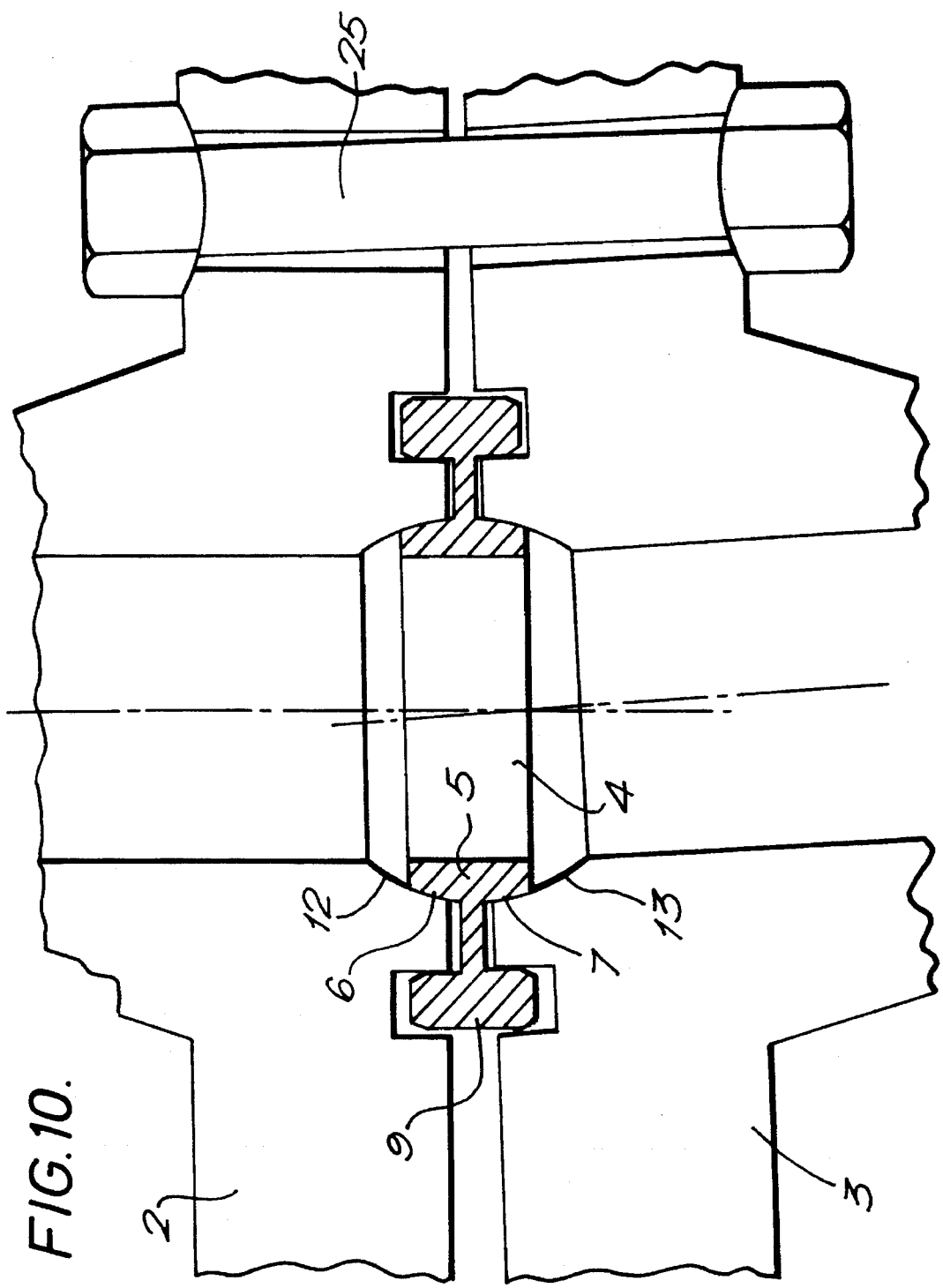

SEAL RING AND JOINT

BACKGROUND OF THE INVENTION

The present invention relates to a seal ring and connection joint for conduits, pressure vessels or the like.

When connecting adjacent sections of fluid flow conduits or vessels, seal rings are typically interposed at the interface of adjacent connecting ranged conduit or vessel portions which are then bolted together. Where high pressure or corrosive fluid is carried in the conduit or vessel, the seal ring used is typically metallic, the seal being effected by elastic or plastic deformation of a sealing surface of the seal ring against sealing portions of the ranged portions.

Known seal rings and joints of the general type are disclosed, for example in U.K. patent specifications 742213, 854189, 952755, 1035958 and 1521546, and PCT specification WO91/19128.

SUMMARY OF THE INVENTION

We have now devised an improved seal ring and associated connection joint.

According to a first aspect of the invention, there is provided an annular seal ring comprising an integrally formed sealing portion, spigot portion and interconnecting web portion, said sealing portion comprising a pair of annular seal lips facing the spigot portion and extending in a transverse direction to said web portion, which web portion extends radially outwardly from said pair of seal lips to said spigot portion, which spigot portion is provided with spigot projections projecting in mutually opposed directions transversely to the web portion, wherein the thickness of said spigot portion in the radial direction is substantially greater than the thickness of the web portion in the transverse direction, and each respective seal lip is arranged to project transversely from said web portion by a distance which is substantially greater than the thickness of said web portion in said transverse direction.

It is preferred that the thickness of the spigot portion in the radial direction is substantially greater than the thickness of the web in the transverse direction over substantially the whole transverse extent of the spigot portion.

The pair of annular seal lips are preferably arranged each on a respective radially outer portion of the sealing portion, and advantageously slope radially outwardly and toward one another to the web portion.

It is preferred that each spigot projection is provided with a respective first transverse face portion facing a respective seal lip, which transverse face portion is advantageously disposed substantially perpendicular to the radial direction.

Typically, each spigot projection is provided with a respective second transverse face portion spaced from the respective first transverse face portion and facing in an opposed direction thereto. Advantageously, the first and second transverse face portions provided on each spigot projection are substantially parallel to one another.

Typically, the second transverse faces comprise the radially outermost extent of the seal ring. Advantageously the second transverse faces are coplanar thereby defining a substantially continuous annular radially outer surface of the seal ring.

It is preferred that the respective spigot projections are provided in the region of their transversely projecting limits with respective tapered or chamfered portions.

Typically, the spigot portion projects transversely from the web portion at least as far as the sealing lips project transversely from the web portion.

It is preferred that the web portion is provided with substantially parallel opposed radially extending surfaces which are advantageously substantially parallel to the radial direction.

In one preferred embodiment of the invention, the spigot projections are provided with respective further sealing means, such as respective peripheral sealing rims or the like.

In a further preferred embodiment, the sealing lips may be provided with annular plastically deformable rims at their transversely outermost projecting limit. Typically the seal ring is principally or wholly of metallic material.

According to a second aspect of the invention, there is provided a conduit joint comprising a seal ring according to the first aspect of the invention interposed at an interface between a pair of conduit or vessel defining members, said members being provided at said interface with respective recessed portions complementarily shaped and dimensioned to receive respective portions of the spigot portion, and the sealing portion of the seal ring, respectively, wherein a first one of said recessed portions comprises an annular groove having substantially parallel radially spaced sidewalls, and a second one of said recessed portions comprises an annular surface sloping away from said interface in an inwardly radial direction.

The annular surface sloping away from the interface in an inwardly radial direction is, advantageously, frustoconical or part spherical.

In use, a spigot projection of the seal ring is received in the first one of the recessed portions of a conduit or vessel defining member, with a respective sealing lip abutting the second one of said recessed portions. Corresponding first and second recessed portions of the other conduit or vessel defining member are arranged to receive/abut the corresponding other spigot projection and sealing lip of the seal ring.

Typically, the annular groove comprising first recess portion is provided with substantially parallel radially spaced sidewalls which are configured substantially perpendicularly to the radial direction. Advantageously, the radially outermost sidewall of the annular groove is substantially more extensive in a direction perpendicular to the radial direction than the extent of the radially innermost sidewall of the annular groove in a direction perpendicular to the radial direction.

Advantageously, the radially innermost sidewall and radially outermost sidewall of the groove connect with respective substantially perpendicular facing surfaces of the respective conduit or vessel, at least one of which surfaces is advantageously arranged to lie at an interface between the pair of conduit or vessel defining surfaces. It is preferred that the facing surfaces on each conduit or vessel defining member are substantially parallel to one another, and advantageously spaced from one another in a direction transverse to the radial direction.

Typically, the conduit-defining or vessel-defining members will be flanged members arranged to be bolted together with the seal ring interposed therebetween to form a sealed joint. In one embodiment of the invention, at least one of the member is a conduit-defining member provided with pressure tapping means extending from the exterior surface of the conduit-defining member to communicate with the respective interface surface at a location, intermediate between the recessed portions, which is shaped to receive the spigot portion and sealing portion of the seal ring. In this embodiment it is generally necessary to provide a pressure-balancing hole in the web portion.

The invention will now be further described in specific embodiments, by way of example only, with reference to the accompanying drawings.

BRIEF DESCRIPTION OF THE DRAWINGS

FIG. 1 is a cross-sectional view of a joint according to the second aspect of the invention provided with a seal ring according to the first aspect of the invention;

FIGS. 2 and 2A are a cross-sectional view of a part of the seal ring of FIG. 1;

FIG. 10 is a cross-sectional view of a further modification of joint and seal ring according to the invention.

DETAILED DESCRIPTION OF THE PREFERRED EMBODIMENTS

Figure 3:
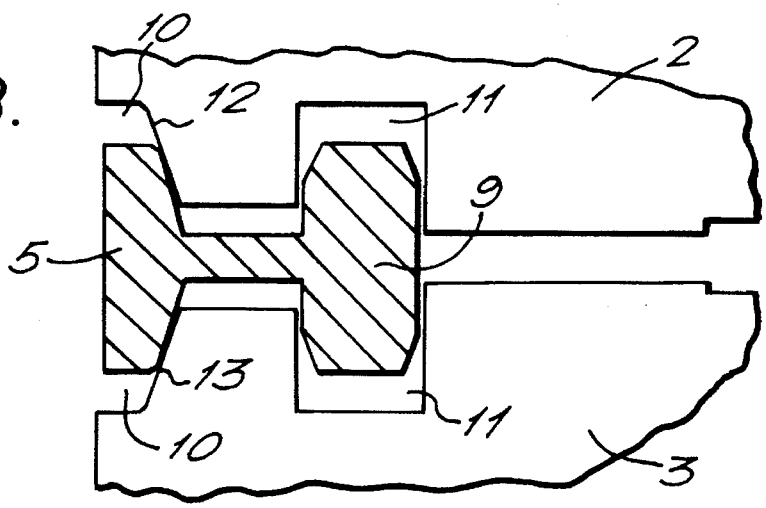
FIGS. 3 and 4 are sectional assembly views of part of the joint and seal ring shown in FIGS. 1 and 2.

Referring to the drawings, and initially to FIG. 1, a joint generally designated 1 comprises first and second flanged connecting members 2, 3 bolted at an interface to define an axial fluid flow path or confined space, such as in a pressure vessel. An annular metallic seal ring 4 (typically of low strength steel, such as mild steel or austenitic stainless steel) is provided at the interface interposed between the flanged members 2, 3 and serves to prevent fluid leaking out of the joint at the interface.

The annular seal ring comprises a primary sealing portion 5 having angled sealing lips 6, 7, a radially outwardly extending web portion 8, and a spigot portion 9 extending transversely to the web portion and connected to the radially distal end thereof. As shown in FIG. 1, the primary sealing portion 5 and spigot portion 9 are received in respective complementary shaped recesses or grooves 10, 11 extending circumferentially around the flanged connecting conduits at their interface.

The web portion 8 has opposed substantially parallel surfaces 8a, 8b with the spigot portion 9 having opposed surfaces 9a, 9b extending substantially perpendicularly thereto.

It is important that the thickness of the spigot portion 9 in the radial direction (dimension w in FIG. 2A) is substantially greater than the thickness of the web portion 8 in the transverse direction (dimension t in FIG. 2A). This ensures that, when the seal ring 4 is in position in a joint, there is substantially no deflection of the spigot portion 9 in the radial direction relative to the web portion on tightening of the joint; radial deflection of the seal ring is therefore generally limited to radial stretch of the web portion and deflection of the seal lips of the sealing portion 5 thereby producing a more effective seal. This feature also provides a stiff and rigid outer periphery for the seal ring, which is particularly important where large seal rings (e.g. diameter dimensions of 0.3 metres or above) are required.

Furthermore, the provision of a thickened spigot portion 9 as described, ensures that shear stresses (which may result from connecting members 2, 3 being non-coaxially aligned when the joint is formed) are taken up by the spigot portion and not the web 8 or sealing portion 5 which would otherwise result in an inefficient seal being produced and/or damage. Typically a thickness ratio (w:t—see FIG. 2A) of at least 1.25:1 and preferably greater than 1.5:1 produces enhanced seal ring characteristics. It is furthermore important that the sealing lips 6, 7 project transversely from the web by a distance (dimension h in FIG. 2A) which is substantially greater than the thickness of the web 8 in the transverse direction (i.e. dimension t in FIG. 2A). This ensures that the seal lips 6 may deflect radially to the required extent to produce an efficient seal on tightening of the joint such that the respective sealing point of the seal ring is displaced in the transverse direction from the web at an optimum distance.

It should also be noted that the spigot portion 9 extends transversely to the web portion 8 to an extent as great as the primary sealing portion 5. If the seal ring 4 is dropped or knocked during transit or assembly, the impact shock and any resulting damage is therefore taken by the spigot portion 9, reducing the risk of damage to the sealing lips 6, 7.

Figure 4:
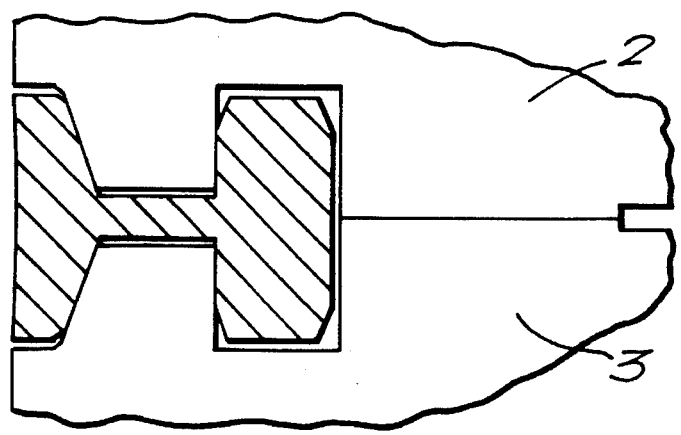

Referring to FIGS. 3 and 4, on assembly of the joint 1, each of the portions of the spigot portion projecting transversely to the web portion 8 engages with its respective annular recess 11 in the flanged members 2, 3 prior to the primary sealing lips 6, 7 initially contacting their respective sealing surfaces 12, 13 on the flanged members 2, 3. This is particularly important in preventing damage to the sealing lips where the flanged connecting members 2, 3 are slightly misaligned (i.e. not coaxial) and need to be forcibly aligned. As the flanged members 2, 3 are aligned, the interface surfaces will "ride" over the ends of the spigot portion 9 and hence not damage the sealing lips 6, 7 on the primary sealing portion 5.

Furthermore, as described above, once the joint is assembled, shear stresses exerted on the seal ring due to misalignment of the flanged members 2, 3 will be to a large extent taken up by the spigot portion 9 and not the primary sealing portion 5. The construction therefore ensures that the primary sealing portion 5 takes up only the contact sealing stresses caused by tightening the flange connecting bolts (not shown). As described above, a further advantage of the spigot portion 9 is that for large diameter seal rings (i.e. typically having a radius of 0.3 metres or more), the rigidity of the seal ring is effectively increased in the joint reducing the likelihood of unwanted flexion of the ring and enabling the general dimensions of the seal ring (particularly the web portion) to be kept to a minimum.

Prior to full tightening of the connecting bolts, the spigot portion will be guilded in its respective annular recesses 10, 11 by means of the "lead in" chamfers 14 provided on the spigot portion 9. Under the action of flange bolting, the flanged members 2, 3 are drawn together onto the seal ring causing seal lips 6, 7 to engage with respective sealing surfaces of 12, 13 of the flanged members 2, 3.

As the seal lips 6, 7 are forced into the recessed seat formed by the sealing surfaces 12, 13 the seal ring lips 6, 7 bend radially inwards, and the whole seal ring including the spigot portion 9 is deflected radially inwards. The radial deflection of the spigot portion can be controlled (e.g. limited) by controlling (e.g. reducing) the clearance between radially innermost portion of the spigot portion 9 and the radially innermost wall of the annular receiving recess 11 such that at a predetermined inward radial deflection of the ring the radially innermost portion of the spigot engages with the radially innermost wall of annular recess 11 thereby preventing further radial deflection of the seal ring as a whole. This forces additional radial deflection (bending) of the seal lips 6, 7 as the joint is tightened, which promotes higher contact forces and therefore higher contact stresses between the lips 6, 7 and respective sealing surface 12, 13 for a ring of a given cross-section. Once the connection bolts are fully tightened and the seal ring is fully "engaged", a fluid seal preventing leakage of fluid from the interior conduit or vessel to the exterior of the joint is provided. It should be noted that the pressure exerted on the seal ring by the fluid in the conduit or vessel has the effect of increasing the sealing contact stresses between lip 6 and sealing surface 12 and lip 7 and sealing surface 13.

Figure 5:
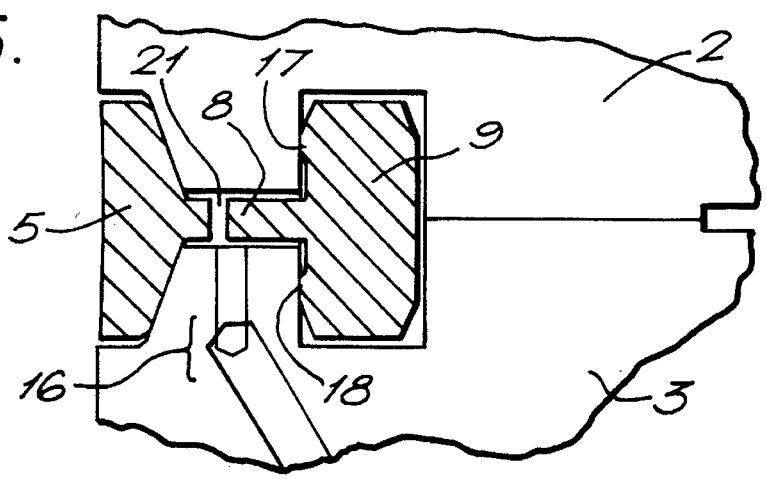
FIG. 5 is a sectional view of part of a modified joint and seal ring according to the invention.

Referring to FIG. 5, a modification of the seal ring 5 and ranged connection members 2, 3 is shown where the ranged member 3 is provided with a pressure tapping 16 extending from the exterior of the joint (not shown) to the interior annular space around the web portion 8; there is further a pressure balancing hole 21 through web portion 8. Further seal lips 17, 18 are provided on the spigot portion 9 which, when the seal is energised, provide a seal on the radially innermost faces of annular recesses 10, 11. Thus the region intermediate the spigot portion 9 and primary sealing portion 5 is effectively sealed.

Leakage of fluid pressure applied to the pressure tapping 16 will give an indication of an inefficient seal having been set up in the joint, and thus provides an effective means of testing the efficiency of the sealed joint prior to pressurising the conduit with fluid.

Figure 6:
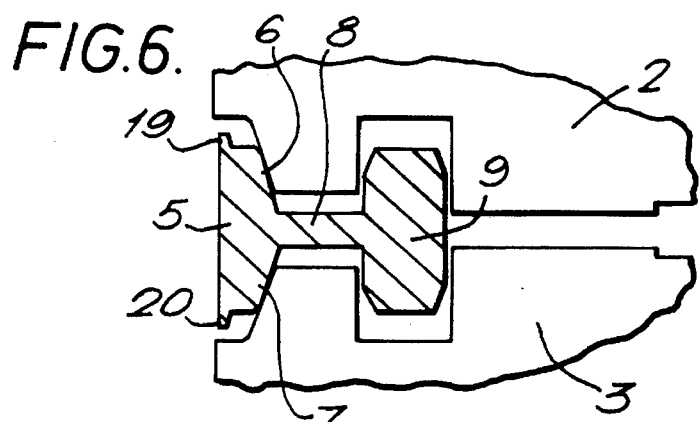
FIGS. 6 and 7 are sectional assembly views of a part of a further modification of joint and seal ring according to the invention.
Figure 7:
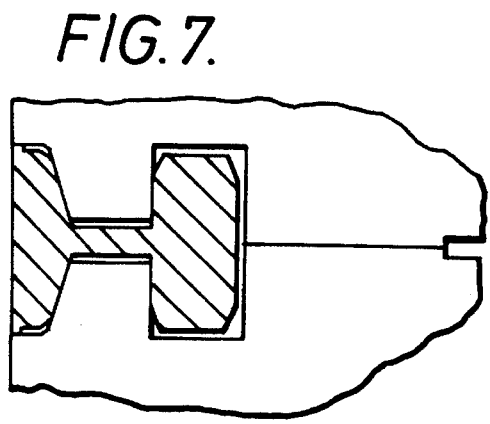

Referring to FIG. 6 and 7, a modified seal is shown having seal lips 6, 7 provided with a further sealing means in the form of crushable metallic rims 19, 20. When the joint is assembled, the crushed rims 19, 20 provide a further seal preventing ingress of potentially corrosive fluids to the primary sealing contact point of the lips 6, 7 with respective surfaces of the ranged connection conduits 2, 3.

Figure 8:
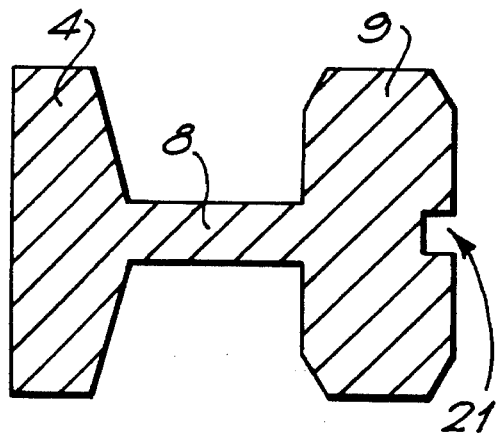
FIGS. 8 and 9 are sectional assembly views of parts of further modifications of joint and seal ring according to the invention.

Referring to FIG. 8, in which like parts are denoted by like numerals, the seal ring has a circumferential groove 21 running around the outermost face of spigot portion 9; such a groove can provide the facility for the seal ring to be prised out after use and provide a means of suspending the ring (via thin twine or similar) in the vertical plane between two flanges of a horizontal pipe run.

Figure 9:
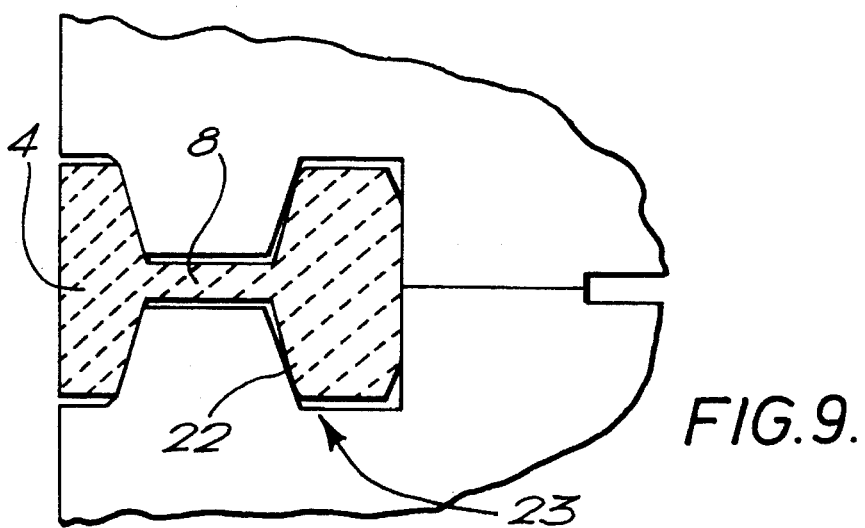

In a further variation shown in FIG. 9, the spigot has an outwardly tapering face 22, tapering outwardly from the web portion 8 (rather than substantially perpendicular thereto), and there is a corresponding taper on the facing surface 23 of the annular receiving recesses 10, 11.

Referring to FIG. 10, there is shown a modified seal ring 4 being interposed between a pair of misaligned flanged connecting members 2, 3. In this application, tightening of flange bolts 25 draws connecting members 2, 3 toward one another forming a seal between seal lips 6, 7 and sealing surfaces 1, 13. The surface of sealing lips 6, 7 and surfaces 12, 13 are part spherical to ensure a better seal when energised. The shear forces set up due to misalignment of the flanged connecting members is taken up by both the spigot portion 9 and also the sealing portion 5. In applications where misaligned flanges are to be connected, it is preferred that the sealing portion 5 is thicker in the radial direction than would otherwise be necessary. It should also be noted that, unlike in relation to the other embodiments described, in the embodiment shown in FIG. 10, the flanged connection members 2, 3 do not abut one another once connected, thereby enabling the full tightening force of bolts 25 to be taken up in the sealing portion 5.

I claim:

1. An annular metallic seal ring substantially solid in cross-section and comprising a sealing portion, spigot portion and interconnecting web portion all formed integrally with one another, said sealing portion comprising a pair of annular seal lips facing the spigot portion and extending in a transverse direction to said web portion, which web portion extends radially outwardly from said pair of seal lips to said spigot portion, which spigot portion is provided with spigot projections projecting in mutually opposed directions transversely to the web portion, wherein the thickness of said spigot portion in the radial direction is at least 1.25 times the thickness of the web portion in the transverse direction, and each respective seal lip is arranged to project transversely from said web portion by a distance which is substantially greater than the thickness of said web portion in said transverse direction.

2. A seal ting according to claim 1, wherein said pair of annular seal lips slope radially outwardly and toward one another to said web portion.

3. A seal ting according to claim 1, wherein the thickness of the spigot portion in the radial direction is substantially greater than the thickness of the web in the transverse direction over substantially the whole transverse extent of the spigot portion.

4. A seal ring according to claim 1, wherein each spigot projection is provided with a respective first transverse face portion facing a respective seal lip.

5. A seal ting according to claim 4, wherein said respective first face portion is disposed substantially perpendicular to the radial direction.

6. A seal ring according to claim 4, wherein each spigot projection is provided with a respective second transverse face portion spaced from the respective first transverse face position and facing in an opposed direction thereto.

7. A seal ring according to claim 6, wherein the first and second transverse face portions provided on each spigot projection are substantially parallel to one another.

8. A seal ring according to claim 6, wherein the second transverse faces comprise the radially outermost extent of the seal ring.

9. A seal ring according to claim 1, wherein the respective spigot projections are provided in the region of their transversely projecting limits with respective tapered or chamfered portions.

10. A seal ring according to claim 1, wherein the spigot projects transversely from the web portion at least as far as the sealing lips project transversely from the web portion.

11. A conduit joint comprising a seal ring according to claim 10, interposed at an interface between a pair of conduit or vessel defining members, said members being provided at said interface with respective recessed portions complementarily shaped and dimensioned to receive respective portions of the spigot portion, and the sealing portion of the seal ring, respectively, wherein a first one of said recessed portions comprises an annular groove having substantially parallel radially spaced sidewalls, and a second one of said recessed portions comprises an annular surface sloping away from said interface in an inwardly radial direction and means to retain said members in sealing engagement with said seal ring.

12. A seal ring according to claim 1, wherein the web portion is provided with substantially parallel opposed radially extending surfaces.

13. A seal ring according to claim 1, wherein the seal lips are provided on respective radially outer portions of the sealing portion.

14. A conduit joint comprising a seal ring according to claim 1, interposed at an interface between a pair of conduit or vessel defining members, said members being provided at said interface with respective recessed portions complementarily shaped and dimensioned to receive respective portions of the spigot portion, and the sealing portion of the seal ring, respectively, wherein a first one of said recessed portions comprises an annular groove having substantially parallel radially spaced sidewalls, and a second one of said recessed portions comprises an annular surface sloping away from said interface in an inwardly radial direction and means to retain said members in sealing engagement with said seal ring.

15. A conduit joint according to claim 13, wherein the means to retain said members in sealing engagement with said seal ring includes flanges on said members arranged to be bolted together with the seal ring interposed therebetween to form a sealed joint.

16. A conduit joint according to claim 14, wherein the annular groove comprises first recess portion is provided with substantially parallel radially spaced sidewalls which are configured substantially perpendicularly to the radial direction.

17. A conduit joint according to claim 16, wherein the radially outermost sidewall of the annular groove is substantially more extensive in a direction perpendicular to the radial direction than the extent of the radially innermost sidewall of the annular groove in a direction perpendicular to the radial direction.

18. An annular metallic seal ring substantially solid in cross-section and comprising a sealing portion, spigot portion and interconnecting web portion formed integrally with one another, said sealing portion comprising a pair of annular seal lips facing the spigot portion and extending in a transverse direction to said web portion, which web portion extends radially outwardly from said pair of seal lips to said spigot portion, which spigot portion is provided with spigot projections projecting in mutually opposed directions transversely to the web portion, wherein the thickness of said spigot portion in the radial direction is at least 1.5 times the thickness of the web portion in the transverse direction, and each respective seal lip is arranged to project transversely from said web portion by a distance which is substantially greater than the thickness of said web portion in said transverse direction, said spigot projections projecting transversely from the web portion at least as far as the sealing lips project transversely from the web portion.

19. A conduit joint comprising a seal ring according to claim 18, interposed at an interface between a pair of conduit or vessel defining members, said members being provided at said interface with respective recessed portions complementarily shaped and dimensioned to receive respective portions of the spigot portion, and the sealing portion of the seal ring, respectively, wherein a first one of said recessed portions comprises an annular groove having substantially parallel radially spaced sidewalls, and a second one of said recessed portions comprises an annular surface sloping away from said interface in an inwardly radial direction and means to retain said members in sealing engagement with said seal ring.

* * * * *